United States Patent [19]

Kamimura et al.

[11] Patent Number: 5,068,795

[45] Date of Patent: Nov. 26, 1991

[54] SYSTEM FOR DETECTING POSITION OF MOVING VEHICLE

[75] Inventors: Kenji Kamimura; Sadachika Tsuzuki, both of Saitama, Japan

[73] Assignee: Honda Giken Kogyo Kabushiki Kaisha, Tokyo, Japan

[21] Appl. No.: 413,934

[22] Filed: Sep. 28, 1989

[30] Foreign Application Priority Data

Oct. 18, 1988 [JP] Japan .................................. 63-262191

[51] Int. Cl.$^5$ ............................................... G06F 15/50
[52] U.S. Cl. ................................. 364/449; 364/424.02; 318/587; 356/375; 180/167; 180/169
[58] Field of Search .................... 364/443, 449, 424.02; 250/560, 561; 180/167–169; 358/103; 318/587; 356/1, 152, 375

[56] References Cited

U.S. PATENT DOCUMENTS

| | | | |
|---|---|---|---|
| 3,687,556 | 8/1972 | Price et al. ................................ | 356/1 |
| 4,225,226 | 9/1980 | Davidson et al. .................... | 364/449 |
| 4,305,077 | 12/1981 | Tsumura . | |
| 4,309,758 | 1/1982 | Halsall et al. ........................ | 364/449 |
| 4,626,995 | 12/1986 | Lofgren et al. ...................... | 364/449 |
| 4,700,301 | 10/1987 | Dyke ........................................ | 356/1 |
| 4,796,198 | 1/1989 | Boultinghouse et al. ........... | 250/561 |
| 4,818,107 | 4/1989 | Ono et al. ............................ | 356/375 |
| 4,936,678 | 6/1990 | Gordon et al. ...................... | 356/375 |
| 4,964,722 | 10/1990 | Schumacher ........................ | 356/152 |

Primary Examiner—Gary Chin
Attorney, Agent, or Firm—Pollock, Vande Sande and Priddy

[57] ABSTRACT

A system for detecting the position of a moving vehicle comprising a light beam receiver mounted on a moving vehicle and rotated in a horizontal plane for receiving light signals from at least four reference points secured at positions apart from the moving vehicle, detecting the differential azimuths between the respective reference points viewed from the moving vehicle on the basis of the received light output of the light beam receiver, calculating the sums of each pair of differential azimuths adjoining each other to select the particular combination of two differential adjoining azimuths whose sum is largest, and determining the position and the advance direction of the moving vehicle on the basis of the azimuths and the coordinates of the three reference points forming selected two differential azimuths.

4 Claims, 7 Drawing Sheets

SYSTEM FOR DETECTING POSITION OF MOVING VEHICLE

BACKGROUND OF THE INVENTION

1. Field of the Invention

The present invention relates to a system for detecting a position of a moving vehicle, and particularly to a system for detecting the position of a moving automobile, an unmanned mobile and carrying device in a factory, or an automated vehicle such as agrcultural, civil enginnering machinery or the like.

2. Description of the Prior Art

Heretofore, as a system for detecting a present position of a moving body such as the moving vehicles as described above, there has been proposed a system provided with a means for scanning a light beam emitted from a moving body in the circumferential direction or every azimuthal direction centering around the moving body, light-reflecting means for reflecting to return the light beam in the direction of incident light and secured at at least three positions apart from the moving body, and a beam receiver means for receiving light reflected from the light-reflecting means (Japanese Patent Laid-open No. 67476/1984).

In the above mentioned prior art, differential azimuths between adjoining two of three light-reflecting means centering around the moving body are detected on the basis of received beam output of the light-receiving means, and then a position of the moving body is determined based on the detected differential azimuths and positional information of the light-reflecting means which have been previously set.

In such prior art system, if a moving body having a beam-receiving means mounted thereon is positioned in the neighborhood of the central portion of a triangle with the respective light-reflecting means secured at the three positions as the vertexes, the position of the moving body can be determined with a fairly high precision. However, there was a problem that, in a position apart from the neighborhood of the central portion of the triangle, it was difficult to obtain a high measuring precision.

As a countermeasure therefor, for instance, as described in Japanese Patent Laid-open No. 14114/1985 or No. 15508/1985, there have been proposed methods for measuring the position of a moving body wherein reference points are set on the vertexes of a quadrangle surrounding the area in which the moving body travels, optimum three reference points of the four reference points with which a high measuring precision can be expected are selected, and the positional detection of the moving body is performed on the basis of the positional information of the selected three reference points and the azimuths of the reference points viewed from the moving body.

In the method described in Japanese Patent Laid-open No. 14114/1985 of the above-mentioned methods for determining the position of the moving body, first the position of the moving body is temporarily determined on the basis of the azimuths of the four reference points, the reference point of said four reference points nearest the moving body is determined, and the position of the moving body is determined again on the basis of the positional informations and azimuths of the reference point nearest the moving body and additional two reference points at both sides of the nearest reference point, a total of three reference points.

On the other hand, also in the method described in Japanese Patent Laid-open No. 15508/1985, based on the temporarily determined position of the moving body, a triangle surrounding the moving body is found, three reference points which are the three vertexes of this triangle are selected, and the position of the moving body is redetermined from the positional information and azimuths of the selected three reference points.

Thus, in the prior art, there was a problem that the procedure for selecting the reference points to be used for determining the position of a moving body (hereinafter referred to as a moving vehicle) was complicated.

SUMMARY OF THE INVENTION

An object of the present invention is to overcome the above described problem of the prior art and to provide a system for detecting the position of a moving vehicle wherein selection of the reference points to be used for determining the position of the moving vehicle can easily be performed, and as a result, a high-precision positional detection is enabled on the basis of the positional information of the selected reference points.

In order to solve the above described problem and accomplish the object, the present invention is primarily characterized by comprising a beam receiving means mounted on a moving vehicle and rotated in a horizontal plane for receiving light signals from at least four reference points secured at positions apart from the moving vehicle, a means for detecting the differential azimuths between the respective reference points viewed from the moving vehicle on the basis of the received light output of the beam receiving means, and a means for calculating the sum of two differential azimuths adjoining each other to select the combination of two differential azimuths the sum of which is largest, wherein the position and the advance direction of the moving vehicle are operated on the basis of the azimuths and the coordinates of the three reference points forming the selected two differential azimuths in respect of the moving vehicle and on the basis of the selected two differential azimuths.

Also, the present invention, in addition to the first characteristic feature, is characterized in that a light emitting means rotating with the beam receiving means is provided, and that means for emitting light beams from the reference points are constructed with light-reflecting means which reflect the radiated light from the light emitting means in the direction of incidence thereof.

When, in the present invention having the above-mentioned construction, a combination of differential azimuths which makes the sum of two differential azimuths largest is selected, the moving vehicle is positioned inside and near center of a triangle the vertexes of which are the three reference points forming the two differential azimuths. Since the position and the advance direction of the moving vehicle are operated on the basis of the coordinates and the azimuths in respect of the moving vehicle, of the three reference points which are selected as mentioned above and on the basis of the selected two differential azimuths, the positional detection precision for the steering control of the moving vehicle can be improved.

DETAILED DESCRIPTION OF THE PREFERRED EMBODIMENTS

Figure 6:
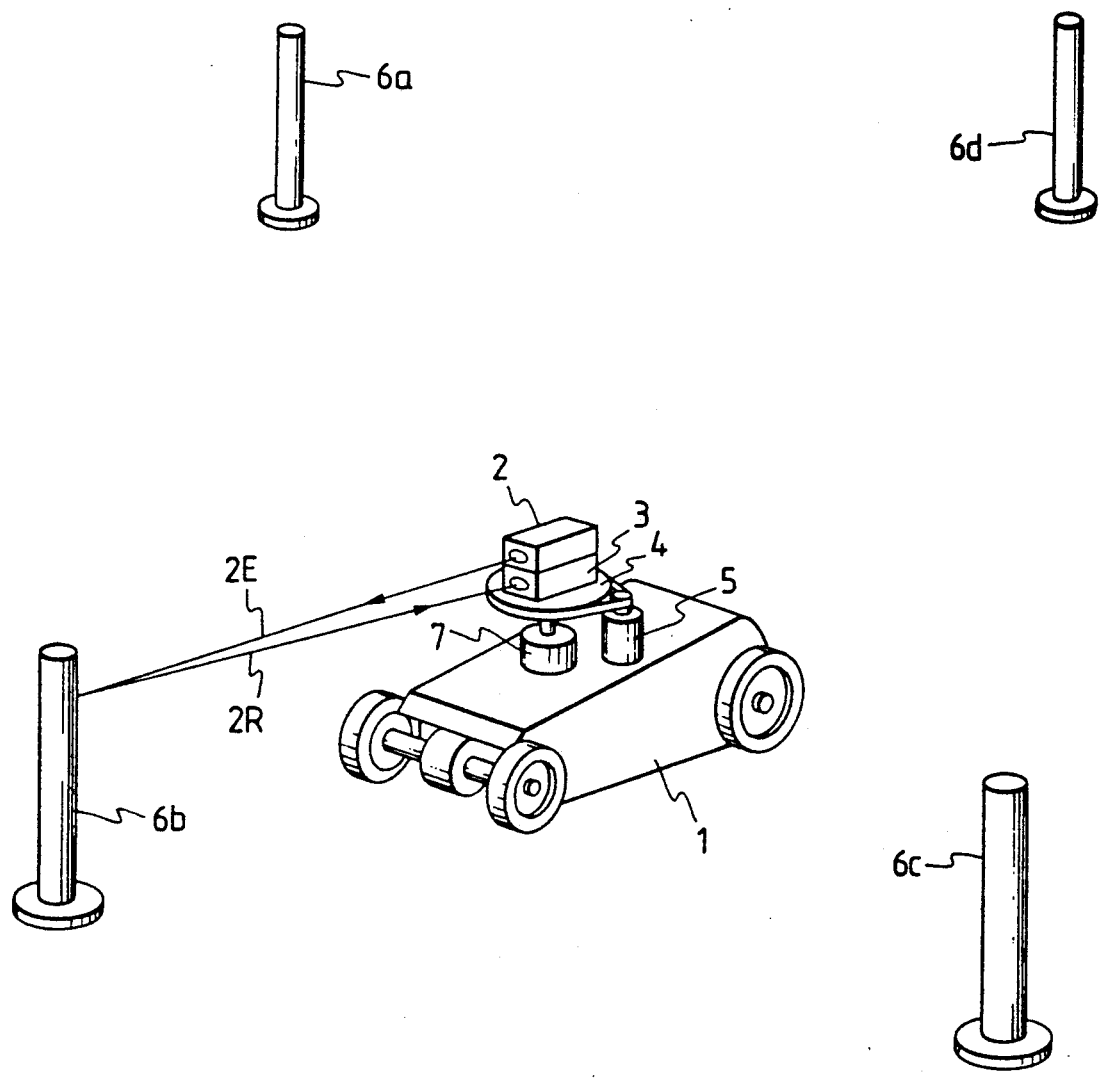
FIG. 6 is a perspective view showing a state of arrangement in respect of a moving vehicle and reflectors.

An embodiment of the present invention will be described hereinbelow by referring to the accompanying drawings. FIG. 6 is a perspective view showing a state of arrangement in respect of a moving vehicle carrying the control system according to the present invention and four light reflectors disposed in an area in which the moving vehicle travels.

Figure 3:
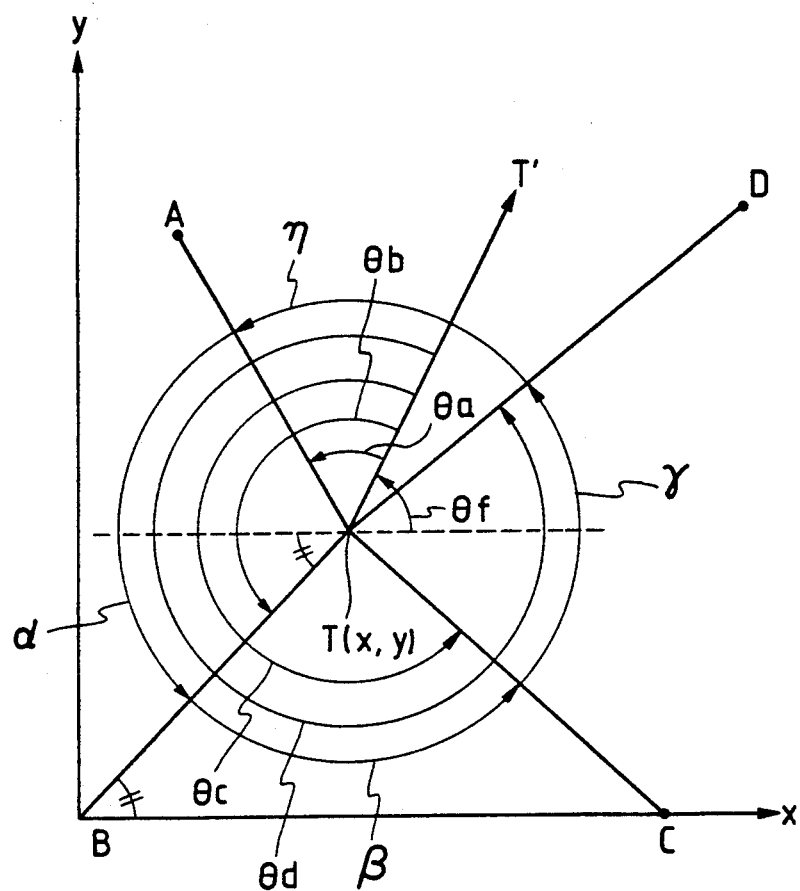
FIG. 3 is an explanatory view for explaining the advance direction and differential azimuths of a moving vehicle.
Figure 4A:
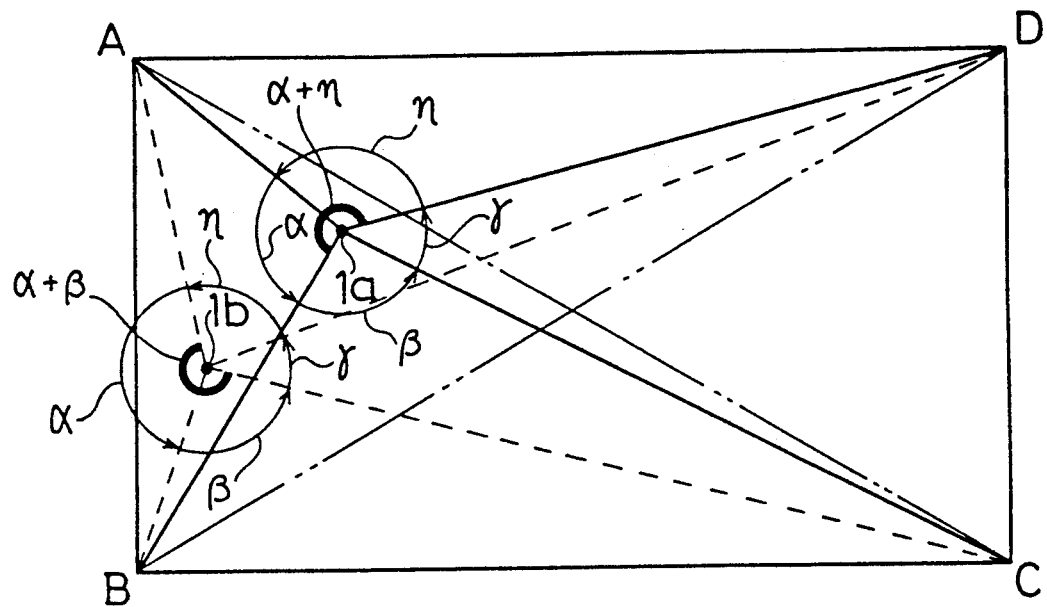
FIG. 4A and FIG. 4B are diagrams illustrating positions of the moving vehicle and the differential azimuths for each region.
Figure 4B:
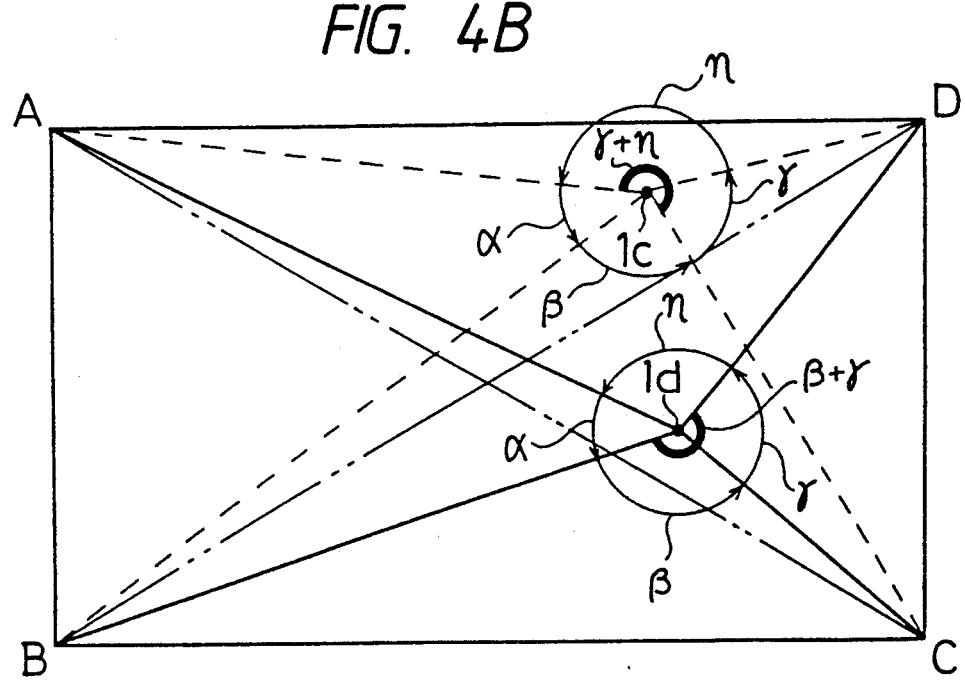

FIG. 3 is a diagram showing a state of arrangement of a moving vehicle and light reflectors on a coordinate system, and FIGS. 4A and 4B are diagrams showing differential azimuths in the working area divided into four regions.

In FIG. 6, the moving vehicle 1 is one for use in agricultural working such as a lawn mower and the like. A rotating table 4 driven by a motor 5 is mounted on the upper part of the moving vehicle 1. The rotating table 4 mounts a beam source 2 for emitting light beam 2E and a beam receiver 3 for receiving light beams 2R reflected by each of the reflectors 6a-6d reflecting the light beam 2E. The beam source 2 is provided with a light beam emitting means (light-emitting diode) and the beam receiver 3 is provided with a means for receiving incident light to convert it into an electrical signal (photodiode) (both of them are not shown). Furthermore a rotary encoder 7 is disposed so as to be interlocked with a drive shaft of the rotating table 4, so that when pulses output from the rotary encoder 7 are counted, a turning angle of the rotating table 4 can be detected.

The reflectors 6a-6d are located around a working area of the moving vehicle 1. Each of the reflectors 6a-6d has a reflection surface reflecting incident light in the incident direction and for this purpose, a so-called corner cube prism which has been conventionally available on the market and the like may be used.

In FIG. 3, the four reflectors 6 are disposed at reference points A, B, C and D. In the same figure, the positions of the four reflectors 6 are represented on an X-Y coordinate system wherein the point B is fixed as the origin and a line connecting the reference points B and C is defined as the x-axis. A current position of the moving vehicle 1 is represented by T(x, y), and the advance direction TT' in respect of the x-axis is represented by $\theta f$.

By scanning a light beam in the circumferential direction centering around the moving vehicle 1, the azimuths $\theta a$, $\theta b$, $\theta c$ and $\theta d$ of the individual reference points A–D in respect of the advance direction of the moving vehicle are detected. Based on these azimuths, differential azimuths $\alpha$, $\beta$, $\gamma$ and $\eta$ are calculated, and based on the differential azimuths, the coordinates (x, y) of the current position T of the moving vehicle are calculated, and the advance direction $\theta f$ of the moving vehicle 1 is calculated on the basis of the current position and the azimuths $\theta a$, $\theta b$, $\theta c$ and $\theta d$.

As easily understood, if the azimuths of at least three reference points of the four reference points and the differential azimuths there between are detected, the position T and the advance direction $\theta f$ of the moving vehicle 1 can be calculated.

As three reference points, the ones with which the error between the actual values and the calculated values of the current position and the advance direction of the moving vehicle 1 can be expected to be small are selected. Simultaneously, in order to reduce the error between the calculation results and the actual values of the current position and the advance direction of the moving vehicle 1, the position and the advance direction of the moving vehicle 1 are calculated immediately after the differential azimuths and azimuths to be used for the calculation of the current position and the advance direction of the moving vehicle 1 are detected.

For instance, if the beam receiver 3 mounted on the moving vehicle 1 is rotating counterclockwise, the reference points A, B and C are selected, and the azimuths $\theta a$, $\theta b$ and $\theta c$ and the differential azimuths $\alpha$ and $\beta$ are used for calculating the current position and the advance direction of the moving vehicle 1, then the current position T(x, y) and the advance direction $\theta f$ of the moving vehicle 1 are calculated by the following equations (1), (2), (3) and (4) immediately after the reference point C is detected and the differential azimuth $\beta$ is operated.

$$x = xc(1+k. \cot \beta)/(1+k^2) \qquad (1)$$

$$y = kx \qquad (2)$$

$$\theta f = 180° - (\theta b - \tan^{-1} k) \qquad (3)$$

where k is represented by an equation (4):

$$k = (xc - xa - ya. \cot \alpha)/(ya - xa. \cot \alpha - xc. \cot \beta) \qquad (4)$$

and which indicates an inclination of a straight line BT in respect of the x-axis.

Since the procedure and calculating formulas for calculating the positional coordinates and the advance direction of the moving vehicle 1 are shown in detail in Japanese Patent Application Nos. 116689/1988 and 149619/1988, the description thereof is omitted here.

Now, the selection rule of three reference points with which the error between the actual values and the calculated values of the current position and the advance direction of the moving vehicle 1 is expected to be small is described.

In FIGS. 4A and 4B, different positions of the moving vehicle 1 are represented by points 1a, 1b, 1c and 1d in the traveling area of the moving vehicle 1 in which the respective reference points are located at the respective vertexes of a quadrangle ABCD.

As shown in FIG. 4A, points 1a and 1b are positioned inside a triangle ABC and also inside a triangle ABD. It is already known that, if a current position on the moving vehicle 1 is calculated on the basis of the informations of the reference points corresponding to the vertexes of a triangle containing the moving vehicle 1, the error between the result of this calculation and the actual position of the moving vehicle 1 can be made small to some extent.

Accordingly, if the moving vehicle 1 is in position 1a or 1b, whichever of the group of the reference points A, B, and C or A, B, and D can be used as the reference points for calculating a current position of the moving vehicle 1, so that the error between the result of this calculation and the actual value can be suppressed within a small range of some extent.

However, in order to further reduce said error thereby to improve the positional detection precision of the moving vehicle 1, it is preferable that, on the basis of the informations of such reference points that the moving vehicle 1 is positioned as near as possible to the center of a triangle the vertexes of which are said reference points, a position of the moving vehicle 1 is detected.

Accordingly, when the moving vehicle 1 is at the position 1a, it is preferable that the current position of the moving vehicle 1 is calculated on the basis of the reference points A, B, and D, and when the moving vehicle 1 is at the position 1b, it is preferable that the current position of the moving vehicle 1 is calculated on the basis of the reference points A, B, and C.

Similarly, when the moving vehicle 1 is at the position 1c in FIG. 4B, it is preferable that the current position of the moving vehicle 1 is calculated on the basis of the reference points A, C, and D, and when the moving vehicle 1 is at the position 1d, it is preferable that the current position of the moving vehicle 1 is calculated on the basis of the reference points B, C, and D.

Here, if attention is paid to the sum of two adjoining differential azimuths $(\alpha+\beta)$, $(\beta+\gamma)$, $(\gamma+\eta)$, and $(\alpha+\eta)$ of the four differential azimuths $\alpha$, $\beta$, $\gamma$ and $\eta$ between the respective reference points viewed from the moving vehicle 1, the sum of differential azimuths $(\alpha+\eta)$ is largest among the four sums of differential azimuths when the moving vehicle 1 is at the position 1a, and the sum $(\alpha+\beta)$ is largest among the four sums when the moving vehicle 1 is at 1b. Also, when the moving vehicle 1 is at 1c, the sum $(\gamma+\eta)$ is largest, and when the moving vehicle 1 is at 1d, the sum $(\beta+\gamma)$ is largest.

Thus, it will be concluded that if the sum of a certain two of the adjoining differential azimuths is larger than any other sums of two adjoining differential azimuths, the moving vehicle 1 is located at the central part of the particular triangle of the four triangles the vertexes of which are the three reference points forming said certain two adjoining differential azimuths.

That is, if the sum $(\alpha+\beta)$ is largest among said four sums, the moving vehicle 1 is at a position which is in the relatively central portion within the triangle ABC and is most desirably calculated using the differential azimuths $\alpha$ and $\beta$. Similarly, if the sum $(\beta+\gamma)$ is largest, the moving vehicle 1 is at the central portion of the triangle BCD, and if the sum $(\gamma+\eta)$ is largest, the moving vehicle 1 is at the center side of the triangle ACD, and if the sum $(\alpha+\eta)$ is largest, the moving vehicle 1 is at the center side of the triangle ABD.

Therefore, by detecting the combination of two adjoining differential azimuths with which the sum of said two adjoining differential azimuths is largest, it can be determined whether or not the moving vehicle 1 is in a triangle which is advantageously utilized for the calculation. As a result, it is preferable if the current position and the advance direction of the moving vehicle 1 is calculated on the basis of said two adjoining differential azimuths the sum of which becomes largest and the azimuths of the three reference points forming said two adjoining differential azimuths.

In this way, the reference points with which the error can be expected to be smallest can be selected by detecting two differential azimuths adjoining each other the sum of which becomes largest, thereby detecting the three reference points forming said two differential azimuths.

Next, the construction of the control system in the present embodiment will be described in accordance with the block diagram of FIG. 1 wherein the light beam 2E emitted from the beam source 2 is scanned in a rotating direction of the rotating table 4 and the light beam 2E is reflected by one of the reflectors 6a–6d. The light beam 2R reflected by the one of the reflectors 6a–6d is introduced into the beam receiver 3.

The reflected light 2R is detected as a signal indicating azimuth of the respective reflectors 6a–6d defined with respect to an advance direction of the moving vehicle.

In a counter 9, the number of pulses output from the rotary encoder 7 is counted in accordance with rotation of the rotating table 4. The value counted of the pulses is transferred to an angle detection means 10 whenever reflected light is received by the beam receiver 3.

In the angle detection means 10, based on the counted value of the pulses transferred in every reception of the reflected light beam, the azimuth of each of reflectors 6a–6d with respect to the advance direction of the moving vehicle 1 is calculated, and based on the calculated azimuths, the differential azimuth viewed from the moving vehicle 1 is calculated. The differential azimuth detected in the angle detection means 10 is inputted to a differential azimuth adding means 11 where the sum of it and the adjoining differential azimuth detected just previously is calculated.

Here, since the reference points are located at four places, there are four combinations of two adjoining differential azimuths, and the sums of the respective differential azimuths of said four combinations of differential azimuths are calculated.

In a maximum angular sum detection means 12, it is determined whether or not the latest sum of two differential azimuths is largest among the four sums or combinations of differential azimuths, and if the latest sum is the largest combination, a gate 24 is opened as described later.

For instance, if the beam receiver 3 mounted on the moving vehicle 1 is rotated counterclockwise and the azimuths are sequentially detected in the order of the reference points A, B, C and D, $(\gamma+\eta)$ is calculated when the point A is detected, $(\eta+\alpha)$ is calculated when B is detected, $(\alpha+\beta)$ is calculated when C is detected, and $(\beta+\gamma)$ is calculated when D is detected.

When C is detected, for instance, if it is determined that $(\alpha+\beta)$ is largest among the four sums of differential azimuths obtained in the preceding respective calculation timings, it is decided that the time of detection of the reference point C is the time when the calculation of current position and traveling direction should be performed. Subsequently, when detecting the reference point D, $(\beta+\gamma)$ is calculated to be compared with the largest sum $(\alpha+\beta)$, and if $(\beta+\gamma)$ is determined to be larger, it is decided that the time of detection of the reference point D is the time to perform the aforesaid calculation, while, if $(\beta+\gamma)$ is determined to be smaller than $(\alpha+\beta)$, it is decided that the time of detection of the reference point D is not when the calculation should be performed.

Furthermore, $(\gamma+\eta)$ is subsequently calculated on the detection of the reference point A, and $(\gamma+\eta)$ is compared with the largest sum of differential azimuths at the previous operation as to which is larger, and thereafter, a similar operation is repeatedly performed in order.

If it is decided to be the time when the calculation is to be performed, the gate 24 is opened, and the respective values of the differential azimuths the sum of which are largest and the azimuths of the reference points forming said differential azimuths are inputted to a position-advance direction operating means 13.

In a position-advance direction operating means 13, coordinates and an advance direction of the moving vehicle 1 are determined, and the results of the operation are inputted to a comparing means 25. In the comparing means 25, data indicating a traveling course set in a traveling course setting means 16 are compared with the coordinates and the advance direction of the moving vehicle 1 obtained in the position-advance direction operating means 13. The comparison results are supplied to steering means 14, and a steering motor (M) 35 connected to front wheels 17 of the moving vehicle is driven on the basis of the above-mentioned comparative results. An angle of steering for the front wheels 17 driven by the steering motor 35 is detected by means of a steering angle sensor 15 mounted on the front wheels of the moving vehicle 1, and the value detected is fed back to the steering means 14.

A driving means 18 controls starting and stopping of an engine 19 as well as operation of a clutch 20 for transmitting the power of the engine 19 to rear wheels 21.

Figure 1:
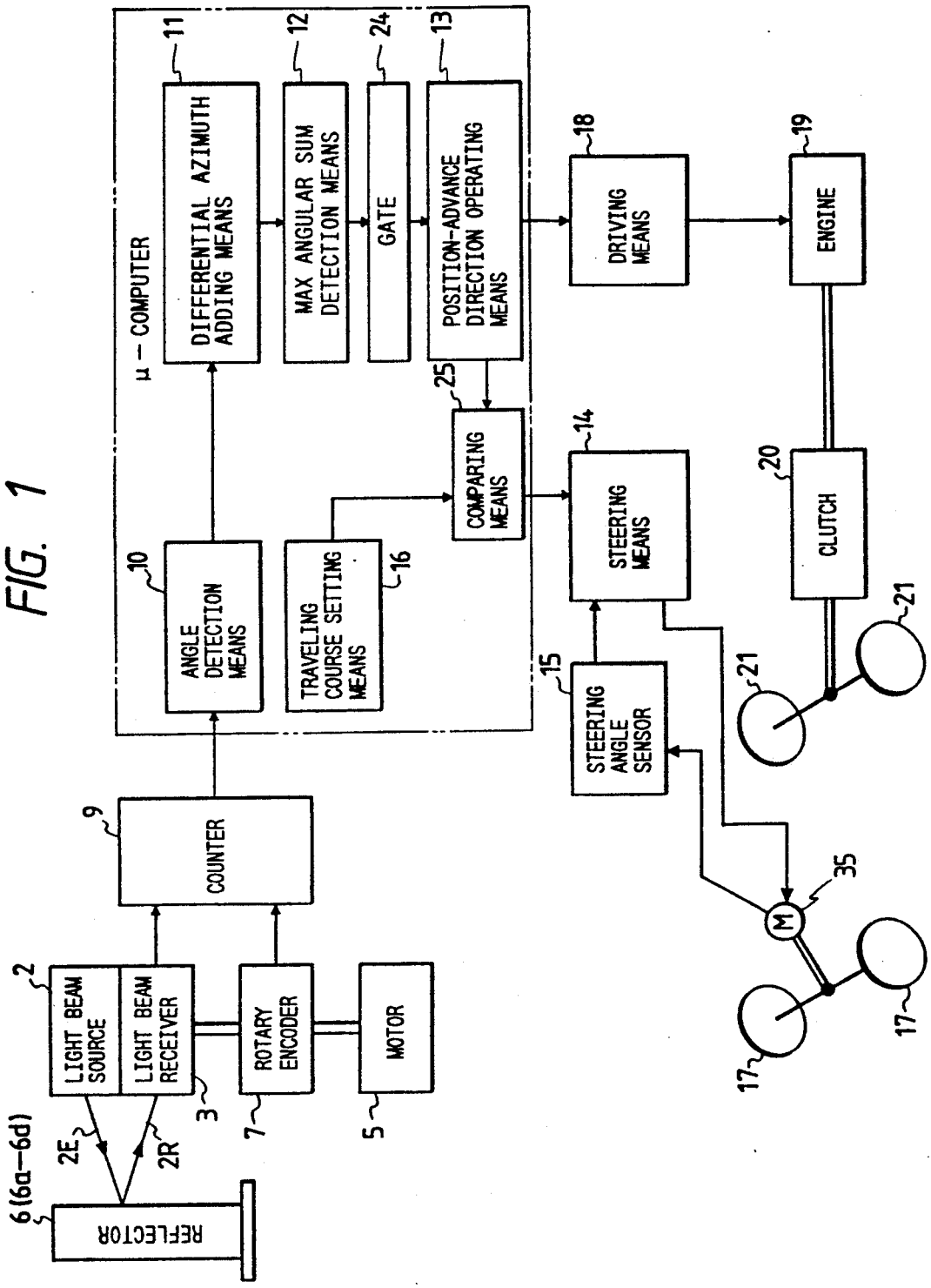
FIG. 1 is a block diagram illustrating an embodiment of the present invention.

Incidentally, of the structural elements shown in FIG. 1, the portion surrounded by a chain line may be constructed by a microcomputer.

Figure 2A:
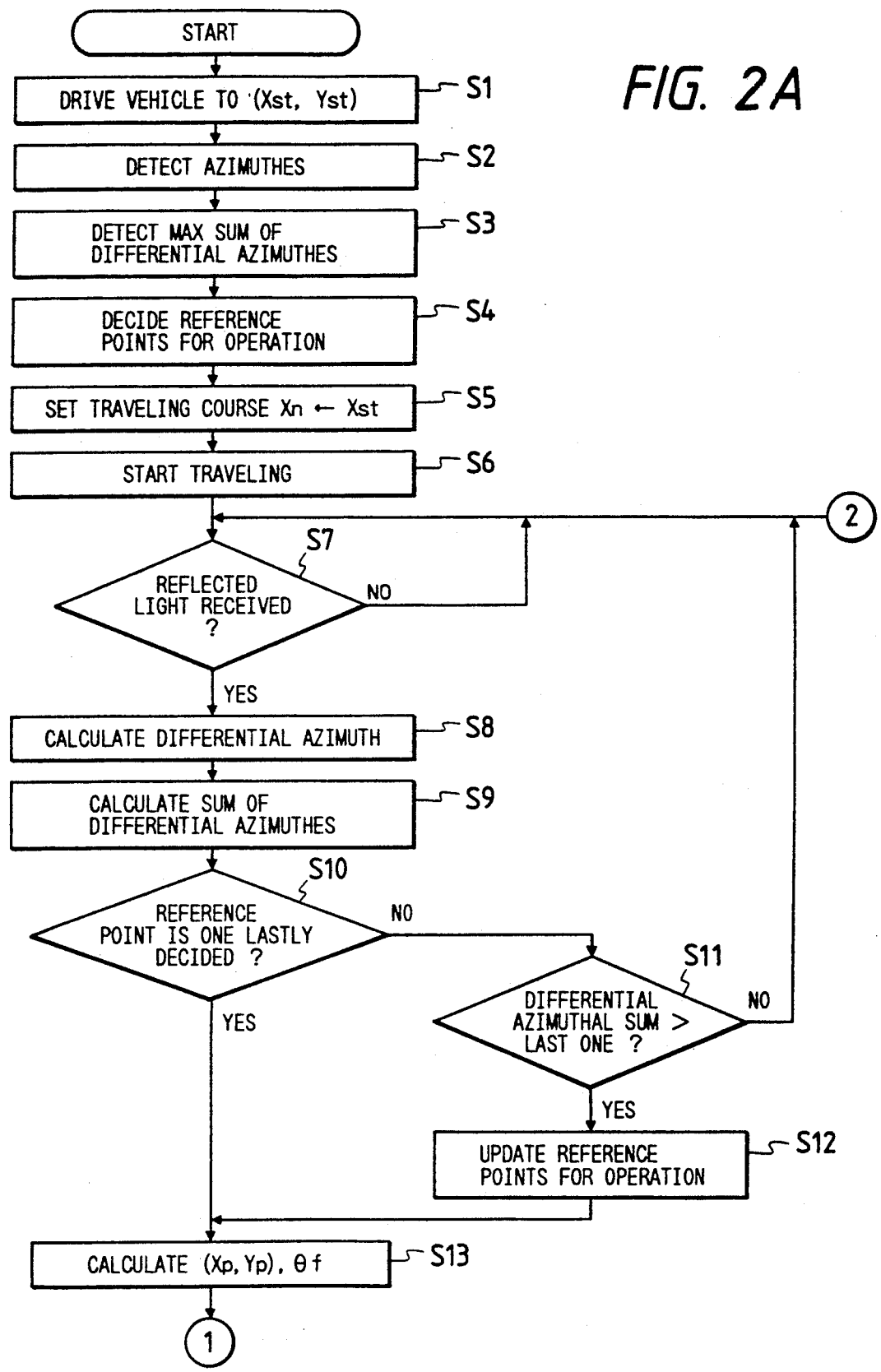
FIGS. 2A and 2B are a flowchart of the steering control.
Figure 2B:
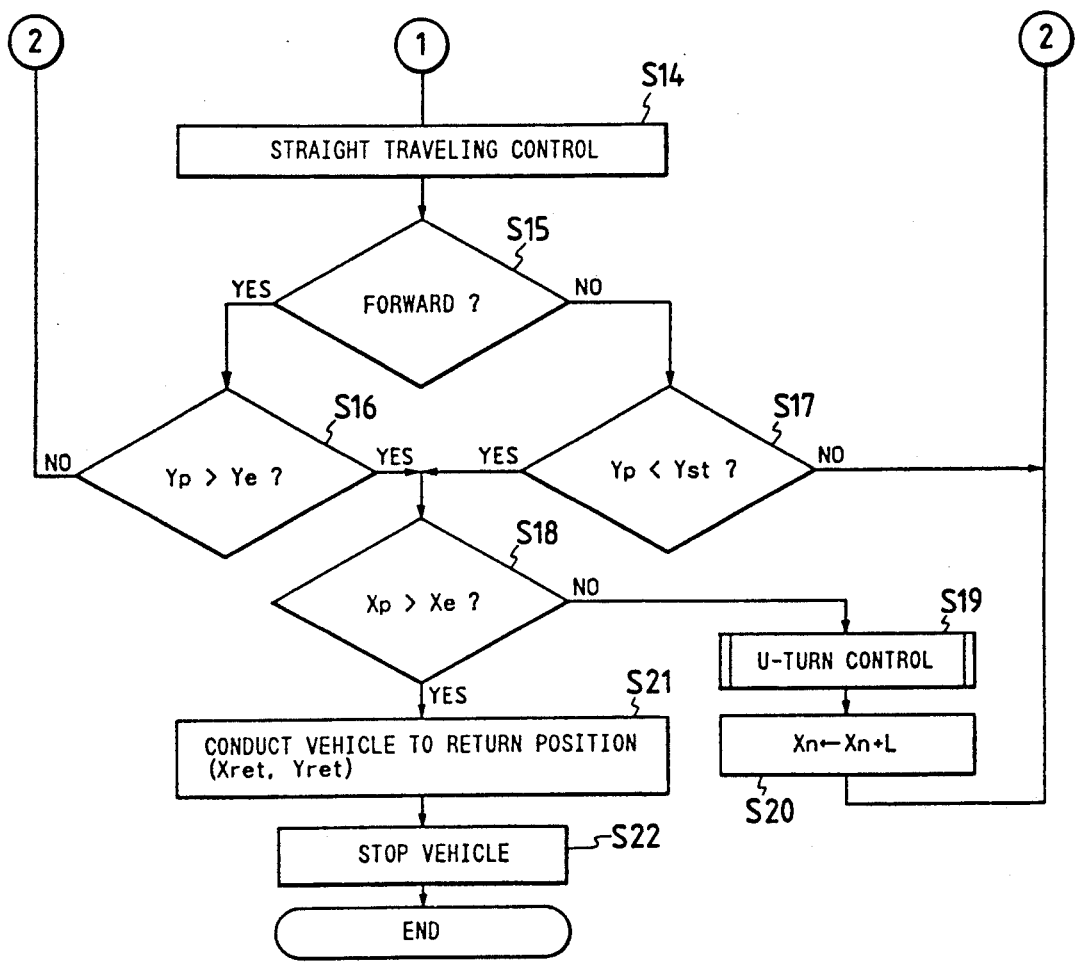
Figure 5:
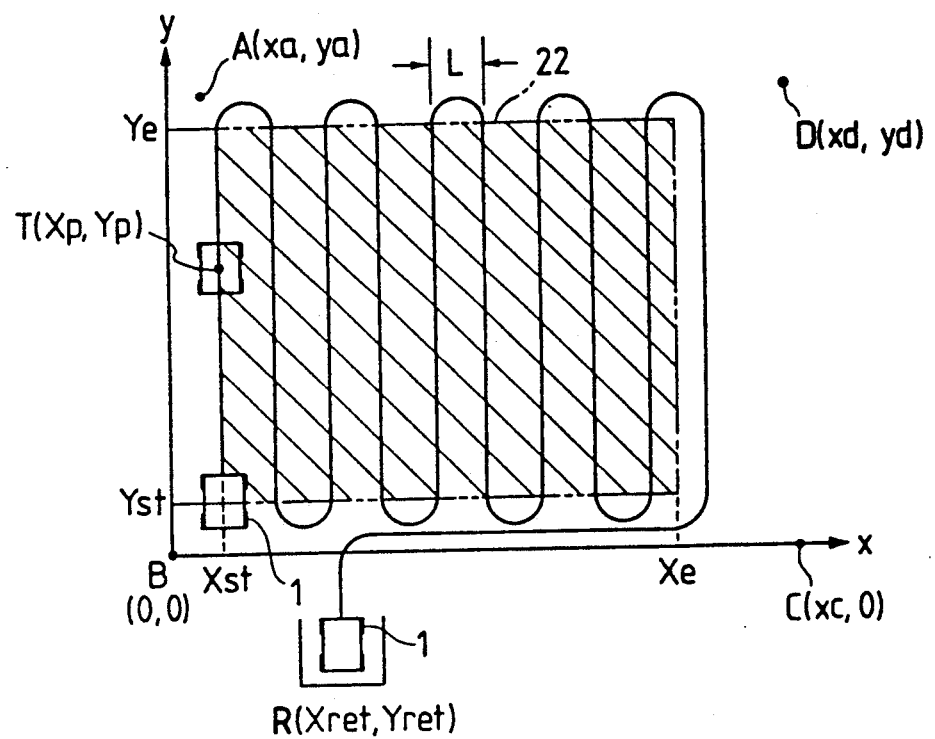
FIG. 5 is a diagram illustrating a state of arrangement in respect of the traveling course of a moving vehicle and reflectors.

Next, steering control for the moving vehicle 1 based on positional information of the moving vehicle 1 calculated in accordance with the above procedure will be described hereinbelow. FIG. 5 is a schematic diagram showing a state of arrangement in respect of a traveling course of the moving vehicle 1 and the reference points A–D, and FIG. 2 is a flowchart illustrating a procedure for steering control.

In FIG. 5, a position and a working area 22 of the moving vehicle 1 are represented on a coordinate system wherein the point B is fixed as the origin, and a straight line extending between the points B and C is defined as the x-axis. (Xret, Yret) indicate coordinates of a returning position R of the moving vehicle 1, and the working area 22 is a quadrilateral region including four apexes of the points represented by four coordinates (Xst, Yst), (Xst, Ye), (Xe, Yst) and (Xe, Ye). The current position of the moving vehicle 1 is represented by T(Xp, Yp).

To simplify the explanation, an example wherein four sides of the working area 22 are parallel to the x- or y-axes is shown in FIG. 5, but another direction and/or shape of the working area may be selected in respect to the points A–C disposed around the working area 22.

In accordance with the flowchart shown in FIG. 2, a control procedure will be described hereinbelow in which it is assumed that the moving vehicle 1 reciprocates in parallel to the y-axis as in the traveling locus of FIG. 5, and the pitch therefor is L.

First, in step S1, the moving vehicle 1 is moved from point R to a working start position (Xst, Yst) by radio control.

In step S2, the beam source 2 and the beam receiver 3 are rotated with the moving vehicle 1 being stopped, for detecting all the reference points as well as the azimuths of the respective reference points viewed from the moving vehicle 1.

In step S3, the sums of the angles of two differential azimuths adjoining each other are calculated to detect the combination of differential azimuths with which said angular sum becomes largest.

In step S4, according to the combination of differential azimuths with which said sum becomes largest, the timing for operating the position and the advance direction of the moving vehicle 1 is determined. As the operation timing, since it is optimum just after the beam receiver 3 has detected a certain reference point, the determination of the operation timing is performed by determining said certain reference point.

For example, if the sum of the differential azimuths $\alpha$ and $\beta$ is largest, the reference point for operation timing is C, and if the sum of the differential azimuths $\beta$ and $\gamma$ is largest, the reference point for operation timing is D.

In step S5, Xst is set as the X-coordinate Xn of the traveling course to decide the traveling course.

In step S6, the traveling of the moving vehicle 1 is started.

In step S7, whether or not the beam receiver 3 has received the reflected light from the reference point is determined. The step S7 is repeated until the reflected light is detected. When the reflected light is detected, the procedure goes to step S8.

In step S8, the azimuth of the reference point detected in step S7 is detected, and based on this azimuth, the differential azimuth is calculated.

In step S9, the sum of the two differential azimuths formed with the reference point detected in step S7 and the other two reference points just before the detection of said reference point is calculated.

In step S10, decision is made as to whether or not the reference point detected in step S7 is one which has been established as the just preceding operation timing. If the decision in step S10 is affirmative, the process proceeds to step S13 for operation of the current position and the advance direction of the moving vehicle 1. But if the decision in step S10 is negative, the process proceeds to step S11.

In step S11, decision is made as to whether or not the sum of the differential azimuths detected in step S9 is larger than the sum of the two differential azimuths used when the position and the advance direction of the moving vehicle 1 was operated previously (or in last operation). In the first flow, decision is made as to whether or not it is larger than the largest differential azimuth calculated in step S3.

If the decision in step S11 is positive, namely, if the sum of the current differential azimuths is larger than the sum of the differential azimuths used in the previous operation of the position and the advance direction of the moving vehicle 1, the procedure proceeds to step S12 where the operation reference point is updated to the reference point detected newly this time.

After the update of the operation reference point, the procedure goes to step S13 where the position and the advance direction of the moving vehicle 1 are operated.

If the decision in step S11 is negative, that is, if the combination of differential azimuths the sum of which is largest is not different from that in the previous operation of the position and the advance direction of the moving vehicle 1, the position and the advance direction of the moving vehicle 1 are not operated, but the procedure returns to step S7 where the reflected light from the next reference point is received.

If the operation reference point is updated in step S12, in the next flow, the decision reference point is replaced by the updated reference point.

In step S14, straight traveling control of the moving vehicle 1 is performed according to the position (Xp, Yp) and the advance direction $\theta f$ of the moving vehicle 1 obtained in step S13.

In step S15, it is judged that either the moving vehicle 1 travels towards the direction going away from the origin (forward direction) or the direction approaching the origin (reverse direction) in the y-axial direction.

In the case of forward direction, it is judged whether one stroke is finished (Yp>Ye) or not in step S16, while in case of reverse direction, it is judged whether one stroke is finished (Yp<Yst) or not in step S17. When it is judged that such one stroke is not finished in either step S16 or step S17, processings in steps S7-S15 are repeated.

In case it is judged that such one stroke is finished in either step S16 or S17, it is judged in the following step S18 whether all the strokes are finished (Xp>Xe) or not.

When all strokes are not finished, the procedure shifts from step S18 to step S19 to effect U-turn control of the automated vehicle 1.

U-turn control is carried out in accordance with a different method from the one for steering control in a straight traveling course wherein the positional information of the moving vehicle 1 operated by the position-advance direction operating means 13 is fed back to the steering means 14.

More specifically, the vehicle 1 is traveled by fixing a steering angle thereof to a predetermined angle in a turning course, and the moving vehicle returns to steering control for a straight traveling course which is effected in accordance with processings of step S14 at the time when at least one of the azimuths of the respective reflectors 6a–6d viewed from the vehicle 1 and which is calculated based on the differential azimuths detected in the angle detection means 10 coincides substantially with a predetermined azimuth. An example of the details of U-turn control for traveling the moving vehicle along the turning course is described in U.S. application Ser. No. 362,630.

In step S20, a pitch L is added to Xn thereby operating (Xn+L) and as a result, the following traveling course is set. After setting of the following traveling course, the procedure returns to step S7 and the above described processings are repeated.

When all strokes are completed, the moving vehicle returns to the return position R(Xret, Yret) in step S21, and the travel thereof stops in step S22.

As described above, in accordance with the present embodiment, the combination of two differential azimuths with which the sum of said two differential azimuths adjoining each other becomes largest is detected, and based on said two differential azimuths and the respective azimuths of the three reference point forming said two differential azimuths, the position and the advance direction of the moving vehicle 1 are operated.

In other words, the operation of the position and the advance direction of the moving vehicle 1 can be performed on the basis of the information on the reference points located at the vertexes of a triangle which contains the moving vehicle 1 as near as possible to the central portion thereof.

In the present embodiment, although the moving vehicle 1 was guided by radio control from the return position to the working start position, it may also allowed that, with the moving vehicle 1 being stopped at the return position R, the light beam is scanned to detect the azimuths of the reference points, the traveling course from the return position R to the working start position (Xst, Yst) is operated on the basis of the azimuths, and the moving vehicle 1 is made to travel along the operated course to the working start position.

In addition, if the reflected light from a reference point was missed or light from another light reflecting object was mistaken for the reflected light from the reference point, there would be a possibility that the steering position cannot be correctly detected. In order to prevent such erroneous operation, it is only needed that the reference point identification process is performed when the beam receiver 3 receives light and then the processings of step S9 and succeeding steps in the flowchart shown in FIG. 2 are performed. As the reference point identification process, the reference point identification process disclosed in the Japanese Patent Application No. 262192/1988 can be applied.

Although, in this embodiment, there has been shown an example in which the beam source and beam receiver are both mounted on a moving vehicle, the present invention can be implemented also in a system wherein only a light-receiving means is mounted on the moving vehicle and light beam emitters are disposed at the reference points.

Although, in this embodiment, the operation timing for straight traveling control is made to synchronize with the point of time when the sum of two differential azimuths is detected to be largest, the operation timing of straight traveling control can also be decided by arbitrary interruption. Also, the number of reference points can naturally be greater than four.

As apparent from the above description, the following effects can be achieved by the present invention.

(1) Of the above described four triangular zones, a triangular zone can be selected in which the moving vehicle is located at a position nearest the central portion thereof. As a result, based on the positional information of the three reference points constituting the selected triangular zone, the position and the advance direction of the moving vehicle can be operated, so that the error between the operated values and the actual values can be made small.

(2) Since the selection of the three reference points can be implemented by detecting such combination of differential azimuths that the sum of two particular differential azimuths adjoining each other is larger than the sum of any other two differential azimuthes adjoining each other, the procedure of calculation is simplified.

What is claimed is:

1. In a system for detecting a position of a moving vehicle wherein light signals radiated from light emitting means provided at at least four reference points apart from the moving vehicle are received, and the position and an advance direction of the moving vehicle are detected on the basis of received signals of the light emitted from three particular reference points of the at least four reference points, said system comprising:

light-receiving means mounted on the moving vehicle and rotating in a horizontal plane for receiving the light signals, means for detecting azimuths of the reference points in respect of the advance direction of the moving vehicle on the basis of the light signals at the light-receiving means, means for determining the differential azimuths between the adjoining two reference points of all said four reference points viewed from the moving vehicle, means for calculating the sum for each pair of said differential azimuths adjoining each other, means for selecting a combination of a particular two of said adjoining differential azimuths with which the calculated sum of said two selected adjoining differential azimuths becomes largest among the sums of said other pairs, and means for determining the position and the advance direction of the moving vehicle on the basis of the selected two differential azimuths and the coordinate values of the three reference points forming the selected two differential azimuths.

2. The system for detecting the position of the moving vehicle as set forth in claim 1, which includes a light beam source mounted on the moving vehicle for rotation along with the light-receiving means, the light emitting means being light reflectors which reflect the light radiated from said light beam source in the direction of incidence thereof.

3. The system for detecting the position of the moving vehicle as set forth in claim 1 including means, operative in synchronism with said calculation of the sum for said each pair of adjoining differential azimuthes, for selecting the time at which the position and the advance direction of the moving vehicle should be determined.

4. The system for detecting the position of the moving vehicle as set forth in claim 2 including means, operative in synchronism with said calculation of the sum for said each pair of adjoining differential azimuthes, for selecting the time at which the position and the advance direction of the moving vehicle should be determined.

* * * * *